US011392672B2

(12) United States Patent
Lam et al.

(10) Patent No.: US 11,392,672 B2
(45) Date of Patent: Jul. 19, 2022

(54) COMPUTER PROGRAM CODE OBFUSCATION METHODS AND SYSTEMS

(71) Applicant: Nanyang Technological University, Singapore (SG)

(72) Inventors: Siew Kei Lam, Singapore (SG); Hung Thinh Pham, Singapore (SG); Alexander Fell, Singapore (SG); Veeranna Nandeesha, Singapore (SG)

(73) Assignee: Nanyang Technological University, Singapore (SG)

( * ) Notice: Subject to any disclaimer, the term of this patent is extended or adjusted under 35 U.S.C. 154(b) by 469 days.

(21) Appl. No.: 16/677,660

(22) Filed: Nov. 7, 2019

(65) Prior Publication Data

US 2020/0151305 A1 May 14, 2020

(30) Foreign Application Priority Data

Nov. 9, 2018 (SG) .............................. 10201810007P

(51) Int. Cl.
*G06F 21/14* (2013.01)
*G06F 8/41* (2018.01)

(52) U.S. Cl.
CPC ............... *G06F 21/14* (2013.01); *G06F 8/41* (2013.01); *G06F 2221/0748* (2013.01)

(58) Field of Classification Search
CPC ..... G06F 21/14; G06F 8/41; G06F 2221/0748
See application file for complete search history.

(56) References Cited

U.S. PATENT DOCUMENTS

| 10,140,436 | B1* | 11/2018 | Mahamuni | G06F 21/14 |
| 10,339,837 | B1* | 7/2019 | Gounares | H04L 9/002 |
| 2013/0232578 | A1* | 9/2013 | Chevallier-Mames | G06F 21/10 726/26 |

OTHER PUBLICATIONS

J. A. Ambrose, R. G. Ragel, D. Jayasinghe, T. Li, and S. Parameswaran, "Side Channel Attacks in Embedded Systems: A Tale of Hostilities and Deterrence", 16th International Symposium on Quality Electronic Design, 2015, pp. 452-459.
Q. Ge, Y. Yarom, D. Cock, and G. Heiser, "A Survey of Microarchitectural Timing attacks and Countermeasures on Contemporary Hardware", Journal of Cryptographic Engineering, 2016 pp. 1-27.
D. Molnar, M. Piotrowski, D. Schultz, and D. Wagner, "The Program Counter Security Model: Automatic Detection and Removal of Control-Flow Side Channel Attacks," Information Security and Cryptology. Springer Berlin Heidelberg, 2006, pp. 156-168.
J. Agat, "Transforming out Timing Leaks," Proceedings of the 27th ACM SIGPLAN-SIGACT Symposium on Principles of Programming Languages, 2000, pp. 40-53.

(Continued)

*Primary Examiner* — Hee K Song

(57) ABSTRACT

Methods and systems for obfuscating computer program code are disclosed. In an embodiment, a method of generating obfuscated binary code from input source code for execution on a target processor comprises: generating a set of random obfuscation transform selections; and iteratively optimizing the obfuscation transform selections until a termination criterion is met. The obfuscation transformation selections may comprise indications of custom instructions which are executable on the co-processor in order to reduce side channel leakage.

20 Claims, 14 Drawing Sheets

(56) References Cited

OTHER PUBLICATIONS

J. V. Cleemput, B. Coppens, and B.D. Sutter, "Compiler Mitigations for Time Attacks on Modern x86 Processors", ACM Transactions on Architecture and Code Optimization, vol. 8, No. 4, Article 23, Jan. 2012.

Giovanni Agosta, Alessandro Barenghi, Gerardo Pelosi, Michele Scandale, "The MEET Approach: Securing Cryptographic Embedded Software Against Side Channel Attacks", IEEE Transactions on Computer-Aided Design of Integrated Circuits and Systems, vol. 34, No. 8, Aug. 2015, pp. 1320-1333.

Stephen Crane, Andrei Homescu, Stefan Brunthaler, Per Larsen, and Michael Franz, "Thwarting Cache Side-Channel Attacks through Dynamic Software Diversity", NDSS Symposium, 2015.

Ashay Rane, Calvin Lin, and Mohit Tiwari, "Raccoon: Closing Digital Side-Channels through Obfuscated Execution", 24th USENIX Security Symposium, 2015, pp. 431-446.

Yong C. Kim, Eric D. Trias, and Daniel R. Slaman, "Side Channel Analysis Countermeasures using Obfuscated Instructions", IEEE International Carnahan Conference on Security Technology (ICCST), Dec. 2010.

Damien Couroussé, Thierno Barry, Bruno Robisson, Philippe Jaillon, Olivier Potin, Jean-Louis Lanet, "Runtime Code Polymorphism as a Protection Against Side Channel Attacks", IFIP International Conference on Information Security Theory and Practice (WISTP), Sep. 2016, pp. 136-152.

M. Hataba, R. Elkhouly, and A. El-Mahdy, "Diversified Remote Code Execution Using Dynamic Obfuscation of Conditional Branches", IEEE 35th International Conference on Distributed Computing Systems Workshops, 2015, pp. 120-127.

J.V. Cleemput, B.D. Sutter, K.D. Bosschere, "Adaptive Compiler Strategies for Mitigating Timing Side Channel Attacks", IEEE Transactions on Dependable and Secure Computing, 2017.

Ali Galip Bayrak, Nikola Velickovic, Paolo Ienne, and Wayne Burleson, "An Architecture-independent Instruction Shuffler to Protect Against Side-channel Attacks", ACM Trans. Architecture and Code Optimization, vol. 8, No. 4, Jan. 2012.

J. Danger, S. Guilley, and F. Praden, "Hardware-Enforced Protection against Software Reverse-engineering based on an Instruction Set Encoding," in Proc. ACM SIGPLAN Program Protection Reverse Eng. Workshop, 2014, pp. 5:1-5:11.

Marc Fyrbiak, Simon Rokicki, Nicolai Bissantz, Russell Tessier, and Christof Paar, "Hybrid Obfuscation to Protect Against Disclosure Attacks on Embedded Microprocessors", IEEE Transactions on Computers, vol. 67, No. 3, Mar. 2018, pp. 307-321.

F. Bruguier, P. Benoit, L. Torres, L. Barthe, M. Bourree, and V. Lomne, "Cost-Effective Design Strategies for Securing Embedded Processors", IEEE Transactions on Emerging Topics in Computing, vol. 4, No. 1, Mar. 2016, pp. 60-72.

Yanqi Zhou, Sameer Wagh, Prateek Mittal, and David Wentzlaff, "Camouflage: Memory Traffic Shaping to Mitigate Timing Attacks", IEEE International Symposium on High Performance Computer Architecture (HPCA), Feb. 2017.

Kartik Nayak, Christopher W. Fletchery, Ling Renz, Nishanth Chandranx, Satya Lokamx, Elaine Shik and Vipul Goyal, "HOP: Hardware makes Obfuscation Practical", NDSS, 2017.

L. Ren, C. W. Fletcher, A. Kwon, M. van Dijk, and S. Devadas, "Design and Implementation of the Ascend Secure Processor," IEEE Transactions on Dependable and Secure Computing, 2017.

Z. B. Aweke and T. Austin, "Øzone: Efficient Execution with Zero Timing Leakage for Modern Microarchitectures", IEEE International Symposium on Hardware Oriented Security and Trust (HOST), 2017, pp. 153-153.

Michael Melkonian. 2000. Get by Without an RTOS. Embedded Systems Programming, Sep. 2000, pp. 146-164.

Rocket Chip on Zynq FPGAs. (2017). Retrieved Nov. 2017 from https://github.com/ucb-bar/fpga-zynq.

A. J. Menezes, P. C. Van Oorschot, and S. A. Vanstone, Handbook of applied cryptography. CRC press, 1996.

Pascal Junod, Julien Rinaldini, Johan Wehrli, and Julie Michielin, "Obfuscator-LLVM—Software Protection for the Masses", Proceedings of the IEEE/ACM 1st International Workshop on Software Protection, May 2015, pp. 3-9.

PraxThoughts, "ARM vs RISC-V: Beginning of a New Era", Jun. 2017. Available: https://www.design-reuse.com/industryexpertblogs/42142/arm-vs-risc-v.html.

Lucian Armasu, "Big Tech Players Start to Adopt the RISC-V Chip Architecture", Nov. 2017. Available: https://www.tomshardware.com/news/big-tech-players-risc-v-architecture,36011.html.

Mi-V Embedded Ecosystem. Available: https://www.microsemi.com/product-directory/fpga-soc/3872-embedded-processing.

H. Mantel and A. Starostin, Transforming Out Timing Leaks, More or Less. ESORICS 2015: Springer, 2015, pp. 447-467.

R. L. Rivest et al., "A Method for Obtaining Digital Signatures and Public-key Cryptosystems," Commun. ACM, vol. 21, No. 2, pp. 120-126, Feb. 1978.

X. Lai, "On the design and security of block ciphers," 1992.

* cited by examiner

| | RocketTile | CPU | FPU | RoCC |
|---|---|---|---|---|
| *Slices* | 6612 | 1331 | 3458 | 84 |
| *DSPs* | 34 | 4 | 20 | 10 |

COMPUTER PROGRAM CODE OBFUSCATION METHODS AND SYSTEMS

CROSS-REFERENCE TO RELATED APPLICATIONS

The present application claims priority to Singapore Application No. SG 10201810007P filed with the Intellectual Property Office of Singapore on Nov. 9, 2018 and entitled "COMPUTER PROGRAM CODE OBFUSCATION METHODS AND SYSTEMS," which is incorporated herein by reference in its entirety for all purposes.

TECHNICAL FIELD

The present disclosure relates to methods and systems for obfuscating computer program code and in particular to the generation of computer program code which is secure against both reverse engineering and side channel attacks.

BACKGROUND

Computers have become an integral part of our lives, and hence it is essential that they are secure. Unfortunately, the cryptographic schemes in computers can be deployed in unforeseen adversarial settings, where keys can be compromised through side-channel attacks. Such attacks have been reported [1] where the attacker extracts secret information from a victim program by observing a physical phenomenon, e.g. execution time and power consumption, during its execution [2].

During a side channel attack the secret information of a victim program is communicated through unintentional leakage to the attacker. The attacker can observe the side-channel leakage of the victim program and establish a correlation between the observation and hypothesis about the secret information such as a cryptographic key or details of the algorithm.

A typical countermeasure against side-channel attack is to apply program transformations such that the critical functions of the program are executed in constant time. For example, two representative program transformation techniques are cross-copying [3] and conditional assignment [4]. In cross-copying, an else-branch is added with a dummy task that mimics the execution pattern in the if-branch to equalize the execution time of both branches. In conditional assignment, the condition is directly encoded in both branches using bit masks and bitwise logical operators. These countermeasures suffer from several limitations: Firstly, the program transformations are typically performed on high-level programs. As such, compiler optimizations may inadvertently reduce the effectiveness of the countermeasures, causing timing side-channel vulnerabilities to be revealed at the micro-architecture level. In addition, even though conditional assignment removes critical conditions by flattening and converting them into primitive arithmetic and bitwise instructions, instructions (especially multiplication, division) may cause timing side-channel leakage due to the high bit variations in operand values. Secondly, the existing techniques result in high performance degradation as additional instructions are introduced to equalize the execution times. Thirdly, while the work in [5] performs side-channel aware program transformations, their solutions may suffer from high performance-overhead as the transformations are agnostic to the resulting code complexity.

Compile-time generated software diversity approaches generates diverse but functionally equivalent components of the program at compile time. These diverse components are then randomly selected and executed on the processor at runtime to increase the effort of side-channel attacks. The drawbacks of this approach are as follows. Firstly, this approach leads to large code size since the number of diverse components increase with the number of original components that needs to be protected. This will incur large storage requirements and potentially performance degradation due to memory accesses and cache misses. In addition, the security of the approach is weakened if the diverse components are known to the attackers even though they are randomly executed at runtime. This is possible as the diverse components are typically generated by known compiler transformation techniques, which allows the attackers to guess the executed instances through various channels (e.g. timing measurements). Furthermore, current works do not obfuscate the original programs which enables attackers to easily infer the implementation details of the program from the binaries, thus reducing the effort level for side-channel attacks.

Dynamic compilation approaches use a Just-In-Time (JIT) compiler to harden code against side-channel attacks at runtime. For example, in [12], the sensitive portions of the program are first identified by profiling the code. Those portions are then hardened against time side-channel attacks by normalizing the duration of the execution. Monitors are inserted into the remaining program code to capture paths in the control flow graph which have not been covered by the test cases but are later diagnosed to leak sensitive information. A JIT compiler will recompile these portions to harden them against time side channel attacks while the program is deployed. However, for instance in embedded systems, the use of a JIT is not feasible due to the resource constraints in computation capabilities and storage. Also, if the program code has been obfuscated, a JIT compiler might identify dead code or complex instructions and inadvertently create an executable with a lower obfuscation level. For the method in [10], users are required to learn a non-standard low-level programming language.

Hardware obfuscation techniques require major changes to the processor architecture to enable dynamic randomization of program execution at the microarchitecture level (typically with some compiler support). An instruction shuffler is proposed in [13] to shuffle independent instructions randomly for protection against side-channel attacks. This hardware module is placed between CPU and instruction cache. A secure processor that can protect from side channel attacks using masking and hiding techniques is proposed in [16]. Besides an independent data path to implement the masking scheme, a pipeline randomizer adds non-deterministic dummy control and data signals to the processor data path. A secure processor called Ascend, is presented in [19] which does not leak information through external memory requests due to an ORAM controller that obfuscates the address bus. The work in [20] created an architecture and compiler toolchain to guarantee no leakage of information. Results are obtained by simulating the implemented hardware extensions on a processor simulator. However, the method need to alter the assembler to target a specific architecture (x86), which limits its applicability to other processor architectures. Other strategies that involves notable changes to the processor hardware to protect against side-channel attacks include ISA randomization [14][15], hardware enforced access control [15], masking/hiding in processor pipeline data-path [16], and memory traffic shaping [17].

SUMMARY

According to a first aspect of the present disclosure, a method of generating obfuscated binary code from input source code for execution on a target processor is provided. The method comprises: generating a set of random obfuscation transform selections; initializing a candidate set of obfuscation transform selections with the set of random obfuscation selections; iteratively optimizing the obfuscation transform selections of the candidate set of obfuscation transform selections until a termination criterion is met by: for each candidate obfuscation transform selection of the candidate set of obfuscation transform selections: applying the obfuscation transform selection to the input source code to generate candidate obfuscated source code; compiling the candidate obfuscated source code to generate candidate obfuscated binary code; calculating an obfuscation metric for the candidate obfuscated binary code; calculating an execution time metric for the candidate obfuscated binary code; calculating a security metric for the candidate obfuscated binary code; and based on the calculated obfuscation metric; the calculated execution time metric and the calculated security metric for each candidate obfuscation transform selection, performing genetic operations to update the candidate set of obfuscation transform selections; and once the termination criterion is met, generating an optimized obfuscation transform selection from the candidate set of obfuscation transform selections; applying the optimized obfuscation transform selection to the input source code to obtain optimized obfuscated source code; and compiling the optimized obfuscated source code to generate obfuscated binary code.

In an embodiment, the target processor comprises a main processor and a co-processor and the obfuscation transform selections comprise indications of custom instructions which are executable on the co-processor. The custom instructions may indicate a plurality of diversified instructions from which the co-processor selects one diversified instruction during execution. The custom instructions may be configured to cause the coprocessor to delay for a time period selected during execution.

In an embodiment, calculating the obfuscation metric for the candidate obfuscated binary code comprises calculating a normalized compression distance between the candidate obfuscated binary code and binary code obtained by compiling the input source code.

In an embodiment, calculating the execution time metric for the candidate obfuscated binary code comprises executing the candidate obfuscated binary code in a target processor execution environment. The target processor execution environment may comprise a hardware implementation of the target processor.

In an embodiment, calculating the security metric for the candidate obfuscated binary code comprises estimating a measure of side channel leakage. Estimating the measure of side channel leakage may comprise executing the candidate obfuscated binary code in a target processor execution environment.

According to a second aspect of the present disclosure a compiler system for generating obfuscated binary code from input source code for execution on a target processor is provided. The compiler system comprises: a processor and a data storage device. The data storage device stores computer program instructions operable to cause the processor to: generate a set of random obfuscation transform selections; initialize a candidate set of obfuscation transform selections with the set of random obfuscation selections; iteratively optimize the obfuscation transform selections of the candidate set of obfuscation transform selections until a termination criterion is met by: for each candidate obfuscation transform selection of the candidate set of obfuscation transform selections: applying the obfuscation transform selection to the input source code to generate candidate obfuscated source code; compiling the candidate obfuscated source code to generate candidate obfuscated binary code; calculating an obfuscation metric for the candidate obfuscated binary code; calculating an execution time metric for the candidate obfuscated binary code; calculating a security metric for the candidate obfuscated binary code; and based on the calculated obfuscation metric, the calculated execution time metric and the calculated security metric for each candidate obfuscation transform selection, performing genetic operations to update the candidate set of obfuscation transform selections; and once the termination criterion is met, generate an optimized obfuscation transform selection from the candidate set of obfuscation transform selections; apply the optimized obfuscation transform selection to the input source code to obtain optimized obfuscated source code; and compile the optimized obfuscated source code to generate obfuscated binary code.

According to a further aspect of the present disclosure, non-transitory computer readable carrier medium storing computer executable program instructions which when executed on a processor cause the processor to carry out a method according to recited above is provided.

The embodiments of the present invention combine 1) side-channel-aware code obfuscation with 2) dynamic hardware diversification, to protect against side-channel attacks and reverse engineering attacks. Side-channel-aware code obfuscation is a compiler-driven method that performs program transformations on the original program to protect against reverse engineering while at the same time, ensuring low information leakage in the obfuscated codes and considering the execution time of a program. An optimization algorithm is used to determine the combination of program transformations that leads to solutions with the best obscurity-performance trade-offs, and low side-channel leakage.

Embodiments of the present invention jointly address the optimization of obfuscation process from three different angles, i.e., performance, obscurity, and side-channel leakage. The proposed side-channel-aware code obfuscation method leads to programs with better performance, obscurity, and lower side-channel leakage compared to unguided obfuscation.

Dynamic hardware diversification is achieved by using a compiler to automatically generate instructions in the security-critical segments of the program, which are executed on a co-processor. At runtime, the co-processor produces random (diversified) characteristics on each execution instance of the instructions. The proposed hardware diversification does not require changes to the base processor architecture. The co-processor introduces negligible hardware and power overhead. The invention has a mechanism to explore the performance overhead and security trade-offs of the dynamic hardware diversification method.

Embodiments of the present invention consider a strong adversary threat model, in which an attacker can combine several attack vectors and obtain leaked information through various side-channels. For instance, side-channel attackers need to understand the implementation of a cryptographic algorithm to search for possible launch-pads for attacks. The side-channel-aware code obfuscation method will obfuscate the binary code such that an attacker needs to invest a significant amount of effort to reverse engineer the code even before the side-channel attack can be attempted. The code obfuscation ensures low information leakage in the obfuscated codes so that the attacker cannot exploit any unintended leakage as a result of the obfuscation process. Embodiments of the present invention also aptly addresses the SCARE (Side-Channel Analysis Based Reverse Engineering) attack, where side-channel attacks are used to reverse engineer undisclosed specifications of a proprietary algorithm and to recover secret keys.

Computer program code obfuscated by the methods and systems described herein can be implemented on the RISC-V processor which can be targeted on FPGA or ASIC. The advantages of the described obfuscation methods include the following:

1. The side-channel-aware code obfuscation not only mitigates reverse engineering attacks, but it also simultaneously addresses side-channel attacks while taking into consideration the performance overhead.

2. No special decoder to de-obfuscate the binaries or modified ALU is required. Thus, the obfuscation methods do not require drastic modifications to the base processor architecture. This enables our technology to have lower area and power overhead.

3. The methodology allows for the selection of security-critical program functions/operations to be hardened through program obfuscation and implemented on a co-processor with hardware diversification. The remaining non-security critical programs will execute on the base processor without any overhead. This flexibility in our method will lead to a significant reduction in performance and energy.

4. The obfuscation method, which relies on dynamic hardware diversification overcomes this problem by producing random (diversified) characteristics on each execution instance of the instructions.

5. the use of dynamic hardware diversity enables the same hardware to be realized on different processors to produce different execution characteristics for functionally equivalent programs. Other methods may require a unique compiler and associated decoding unit in the processor. Otherwise, a successful attack on one processor can be easily replicated on others. Implementing different instances of a processor will not be economically or practically feasible with such methods.

BRIEF DESCRIPTION OF THE DRAWINGS

In the following, embodiments of the present invention will be described as non-limiting examples with reference to the accompanying drawings in which.

DETAILED DESCRIPTION

The present disclosure relates to a compiler-driven method to perform side-channel-aware code obfuscation and dynamic hardware diversification to protect computers against side-channel attacks.

Unlike existing program transformation methods that focus only on either increasing the obscurity of the source code [5] or reducing information leakage [3][4], the side-channel-aware code obfuscation method jointly optimizes the obfuscation process from three different angles, i.e. performance, strength of obscurity, and side-channel leakage. This contrasts with existing works, which considered the angles separately, but never in context with each other.

Figure 1:
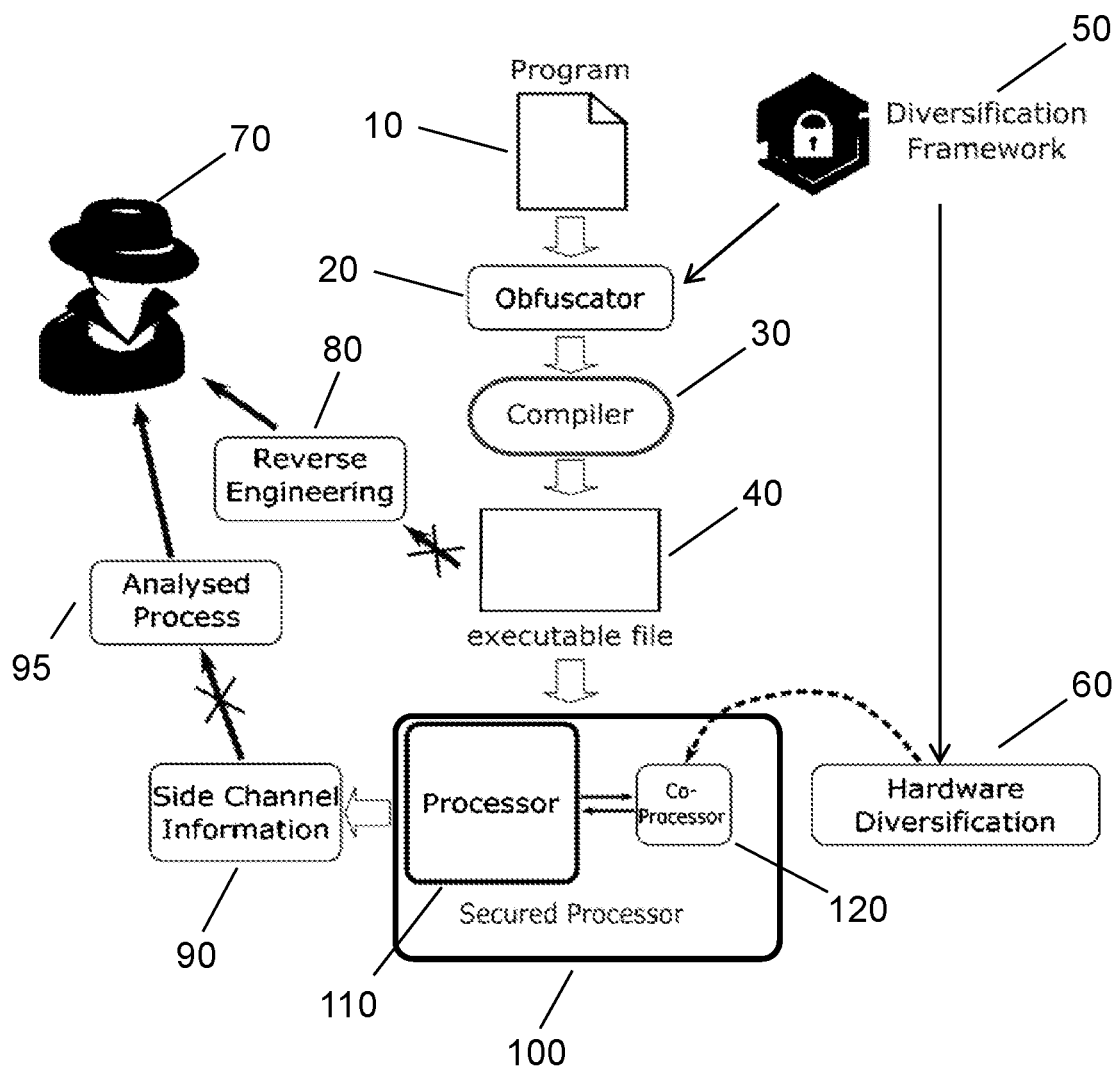
FIG. 1 is a flow diagram showing an overview of a hybrid program obfuscation method according to an embodiment of the present invention.

FIG. 1 is a flow diagram showing an overview of a hybrid program obfuscation method according to an embodiment of the present invention. The input to the method is the original source code 10 of a program. The source code 10 is in the form of a text file in a human readable programming language such as C++. The source code 10 is obfuscated by an obfuscator 20. The obfuscation serves two purposes: protection against reverse-engineering attacks and minimizing leakage of when the program is executed on a target processor 100.

The obfuscated source code is compiled by a compiler 30 to provide an executable file 40 which is in binary machine-readable code for execution by the target processor 100. As shown in FIG. 1, the target processor 100 comprises a processor 110 and a co-processor 120. During the obfuscation process carried out by the obfuscator 20, a diversification framework 50 which provides hardware diversification 60 is used. The co-processor 120 is equipped with a lightweight hardware diversification unit to mitigate side-channel attacks.

As shown in FIG. 1, two types of potential attack by an attacker are prevented. Firstly, the obfuscation prevents the executable file 40 from a reverse engineering attack 80. Secondly, the hardware diversification 60 used by the coprocessor 120 reduces leakage of side channel information 90 which prevents the attacker 70 from conducting a side channel attack by analyzing 95 the side channel information 90.

Unlike the existing works on reducing information leakage [3][4] by transforming the program representation during the compilation stage, methods of the present disclosure randomize the program execution at runtime using dynamic hardware diversity to mitigate side-channel attacks. As such, the obfuscation does not suffer from the dependency of the compiler to balance the characteristics (such as timing, power, etc.) of the execution paths.

The optimization for side-channel aware code obfuscation can be achieved either through analytical methods or heuristics such as simulated annealing, genetic algorithms, swarm optimizations, Tabu search, etc.

Figure 2:
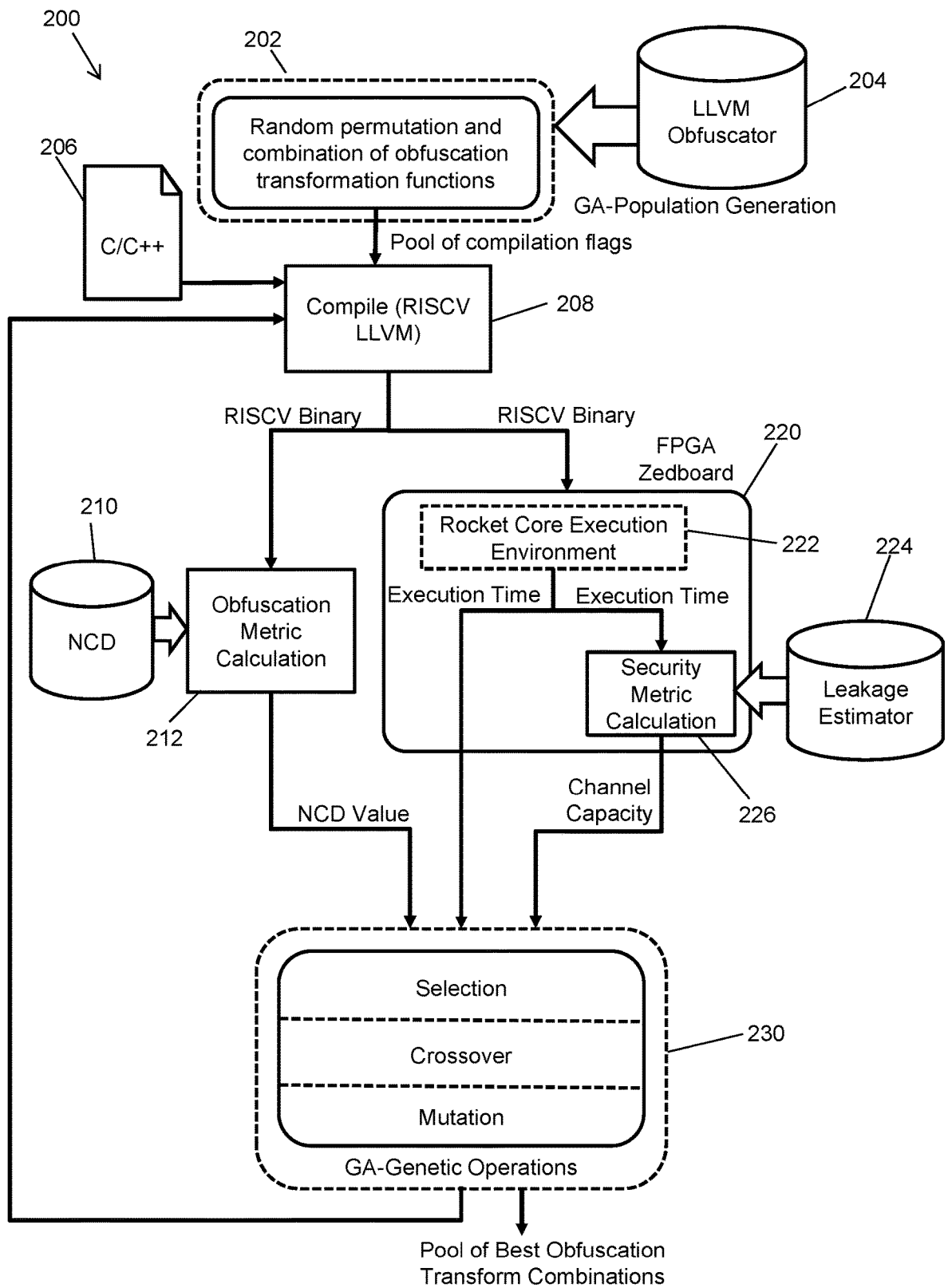
FIG. 2 is a flowchart showing a method of optimizing obfuscation using a genetic algorithm according to an embodiment of the present invention.

FIG. 2 is a flowchart showing a method of optimizing obfuscation using a genetic algorithm according to an embodiment of the present invention. The method 200 shown in FIG. 2 uses a genetic algorithm to iteratively find a solution for a given input program in terms of performance, obscurity and leakage.

In the first stage obfuscation transformation functions 202 are chosen randomly as a population. The obfuscation transformation functions 202 are generated by an LLVM obfuscator 204. The set of permutations and combinations of these functions are the genes. The obfuscation transformations 202 may include both obfuscations targeted at preventing reverse engineering and also obfuscations targeted at reducing side channel leakage.

The population of obfuscation transformations 202 takes the form of a pool of compilation flags. Each compilation flag will apply a specific obfuscation transformation to the entire source code.

In step 208, the source code 206 is compiled for each combination of obfuscation transformation functions. In this example, the compiler generates RISC-V binary code from the C/C++ source code 206. After applying the chosen transformation functions to a given input program to obtain candidate obfuscated binary code, its obscurity, performance and side-channel leakage characteristics are estimated.

In step 212, an obfuscation metric is calculated. The obfuscation metric is calculated as a normalised compression distance (NCD) between the candidate obfuscated binary code and a binary file obtained by compiling the original source code 206. A normalised compression distance (NCD) module 210 calculates the NCD in step 212.

The RISC-V binary code is also input into a hardware implementation of the target processor. In this example, the target processor is implemented on a field programmable gate array (FPGA) Zedboard 220 which provides a Rocket core execution environment 222.

The rocket core execution environment 222 executes the candidate obfuscated binary code and the execution time is recorded. Also, during execution of the candidate obfuscated code, a leakage estimator 224 estimates a measure of the side channel leakage and this is used in step 226 to calculate a security metric. The Shannon's channel capacity, which represents the tight upper bound on the information transmission rate of a channel, may be used as a security metric for timing side channel leakage. The command line tool called LeakiEst may be used to estimate the side channel capacity from observations of program execution times.

The calculated obfuscation metric, execution time metric and security metric for each of the candidate combinations of transformations are fed into a heuristic engine 230 which performs genetic algorithm operations on the combinations of transformations based on the metrics. The heuristic engine aims to optimize a cost function that consists of the calculated obfuscation metric, execution time metric and security metric. While obfuscation transformations resulting in the lowest cost survive for the next iteration via tournament selection, new genes are created by crossover and mutations of individual chromosomes. After twin removal, this set of obfuscation transformations are then given to the compiler 208 to obtain the parameters for the next generation. This process continues iteratively, till the best transformation sequence emerges or till the user terminates the process.

A gene is changed (evolution) and the new transformation is applied to the same input program. The number of iterations and the chosen obfuscation functions and sequences depend on two factors:

1. The resulting program transformation need to satisfy the specifications set by the users.

2. They are highly dependent on the input program. Hence a selected program transformation that works for a particular program, might have adverse effects on a different input program.

In addition to selecting the correct code obfuscation to mitigate side-channel attacks, the framework alters the control flow within security-critical portions of the program to prevent an attacker from siphoning off security relevant implementation details through side-channel attacks. This control flow modification ensures a nearly constant execution time independent of input operands by normalizing the number of instructions within branches such as if-else branches and to ensure that loops are executed independently of dynamic operands. To ensure correctness, storage instructions are modified to prevent the values computed in newly inserted code portions whose purpose is not to compute any result, but to equalize the execution time among branches, impacting the intermediate results. To avoid side channel leakages from the periphery components such as caches, memory accesses and instructions, the framework is able to replace the original instructions with ones that exhibit non-deterministic latencies as explained in below with reference to FIG. 7.

Figure 3:
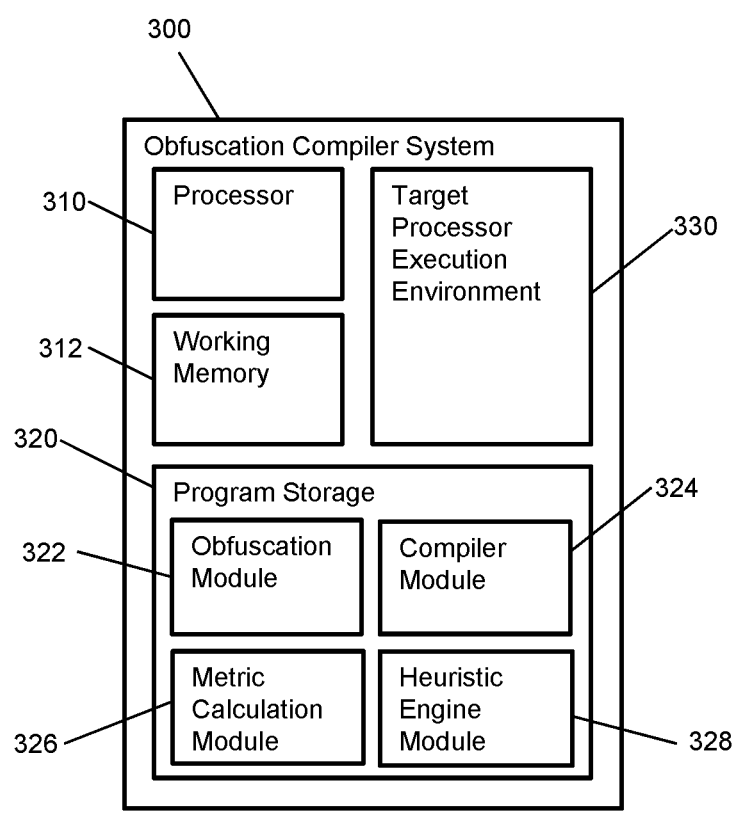
FIG. 3 is a block diagram showing an obfuscation compiler system according to an embodiment of the present invention.

FIG. 3 is a block diagram showing an obfuscation compiler system according to an embodiment of the present invention. The obfuscation compiler system 300 is a computer system with memory that stores computer program modules which implement obfuscation and compiling methods according to embodiments of the present invention.

The obfuscation compiler system 300 comprises a processor 310, a working memory 312, program storage 320 and target processor execution environment 330. The processor 310 may be implemented as one or more central processing unit (CPU) chips. The program storage 320 is a non-volatile storage device such as a hard disk drive which stores computer program modules. The computer program modules are loaded into the working memory 312 for execution by the processor 310.

The program storage 320 stores an obfuscation module 322, a compiler module 324, a metric calculation module 326 and a heuristic engine module 328. The computer program modules cause the processor 310 to execute various well log data processing which is described in more detail below. The program storage 320 may be referred to in some contexts as computer readable storage media and/or non-transitory computer readable media. As depicted in FIG. 3, the computer program modules are distinct modules which perform respective functions implemented by the obfuscation compiler system 300. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the computer program modules is described herein, these may alternatively be implemented as one or more hardware modules (such as field-programmable gate array(s) or application-specific integrated circuit(s)) comprising circuitry which implements equivalent functionality to that implemented in software.

The target processor execution environment 330 may be implemented as hardware by provision of a physical version of the processor and co-processor. Alternatively, the target processor execution environment may be a software simulation of the processor and co-processor.

Figure 4A:
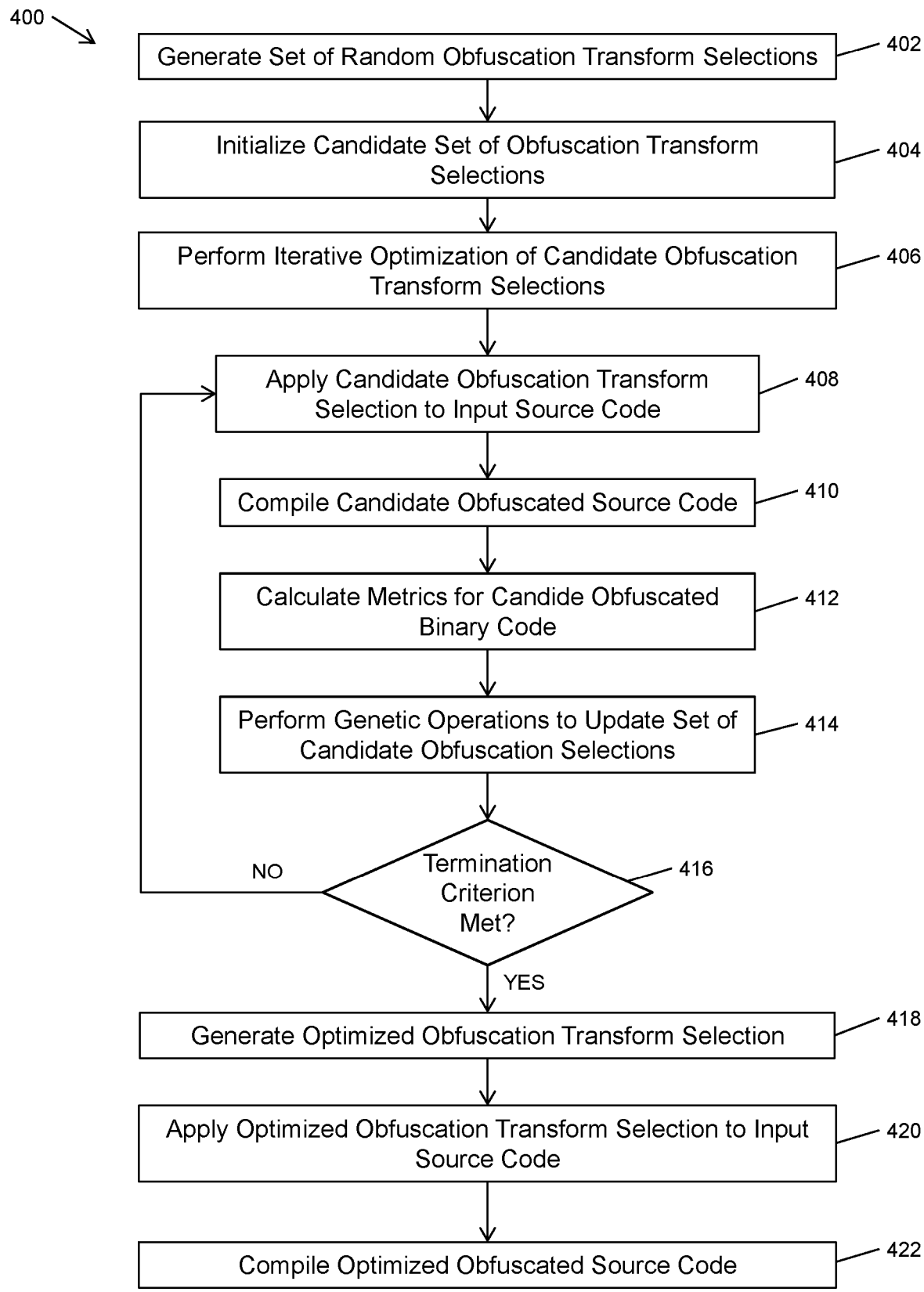
FIG. 4A is a flowchart showing a method of generating obfuscated binary code from input source code for execution on a target processor according to an embodiment of the present invention.

FIG. 4A is a flowchart showing a method of generating obfuscated binary code from input source code for execution on a target processor according to an embodiment of the present invention. The method 400 shown in FIG. 4A is implemented on the obfuscation compiler system 300 shown in FIG. 3. The method 400 is carried out on input source code to generate obfuscated binary code for execution on a target processor.

In step 402, the obfuscation module 322 running on the processor 310 generates a random set of obfuscation transform selections. The obfuscation transform selections each comprise combinations or permutations of obfuscation transforms.

In step 404, the obfuscation module 322 running on the processor 310 initiates a candidate set of obfuscation transform selections as the random set of obfuscation selections generated in step 402.

In step 406, the heuristic engine module 324 running on the processor 310 begins an iterative optimization of the candidate obfuscation transform selections. The optimization process comprises steps 408 to 416 which are described below. Steps 408 to 412 are carried out for each candidate obfuscation selection of the set of candidate obfuscation transform selections.

In step 408, the obfuscation module 322 running on the processor 310 applies the candidate obfuscation transform selection to the source code to generate candidate obfuscated source code.

In step 410, the compiler module 324 running on the processor 310 compiles the candidate obfuscated source code to generate candidate obfuscated binary code.

In step 412, the metric calculation module 326 running on the processor 310 calculates metrics for the candidate obfuscated binary code. These metrics comprise an obfuscation metric, an execution time metric and a security metric. As described above in relation to FIG. 2, the obfuscation metric comprises a normalized compression distance (NCD) which may be calculated by comparing the candidate obfuscated binary code with binary code obtained by compiling the original source code. The execution time metric is calculated by executing the candidate obfuscated binary code on the target processor execution environment 330. The security metric is calculated by estimating side channel leakage as the candidate obfuscated binary code is executed on the target processor execution environment 330.

In step 414, the heuristic engine module 328 running on the processor 310 performs genetic operations to update the set of candidate obfuscation transform selections. The genetic operations comprise a selection operation, a crossover operation and a mutation operation which are carried out between the candidate obfuscation transform selections in the set of candidate obfuscation transform selections based on the metrics calculated for each of the candidate obfuscation transform selections.

In step 416, the heuristic engine module 328 running on the processor 310 determines if a termination criterion has been met. The termination criterion may include threshold values for the metrics, or may indicate a number of iterations of the optimization process. If the termination criterion is not met, the method returns to step 408 and the processing in steps 408 to 414 is repeated on the updated set of candidate obfuscation selections. If the termination criterion is met, the method moves to step 418 in which the heuristic engine module 328 generates an optimized obfuscation transform selection from the updated set of candidate obfuscation transforms.

In step 420, the obfuscation module 322 running on the processor 310 applies the optimized obfuscation transform selection to the input source code to generate optimized obfuscated source code.

In step 422, the compiler module 324 running on the processor 310 compiles the optimized obfuscated source code to generate obfuscated binary code.

The framework including its genetic algorithm to solve the threefold optimization problem will now be described. A genetic algorithm majorly involves three steps: population initialization, fitness function evaluation, and genetic operations.

Figures 4B, 4C:
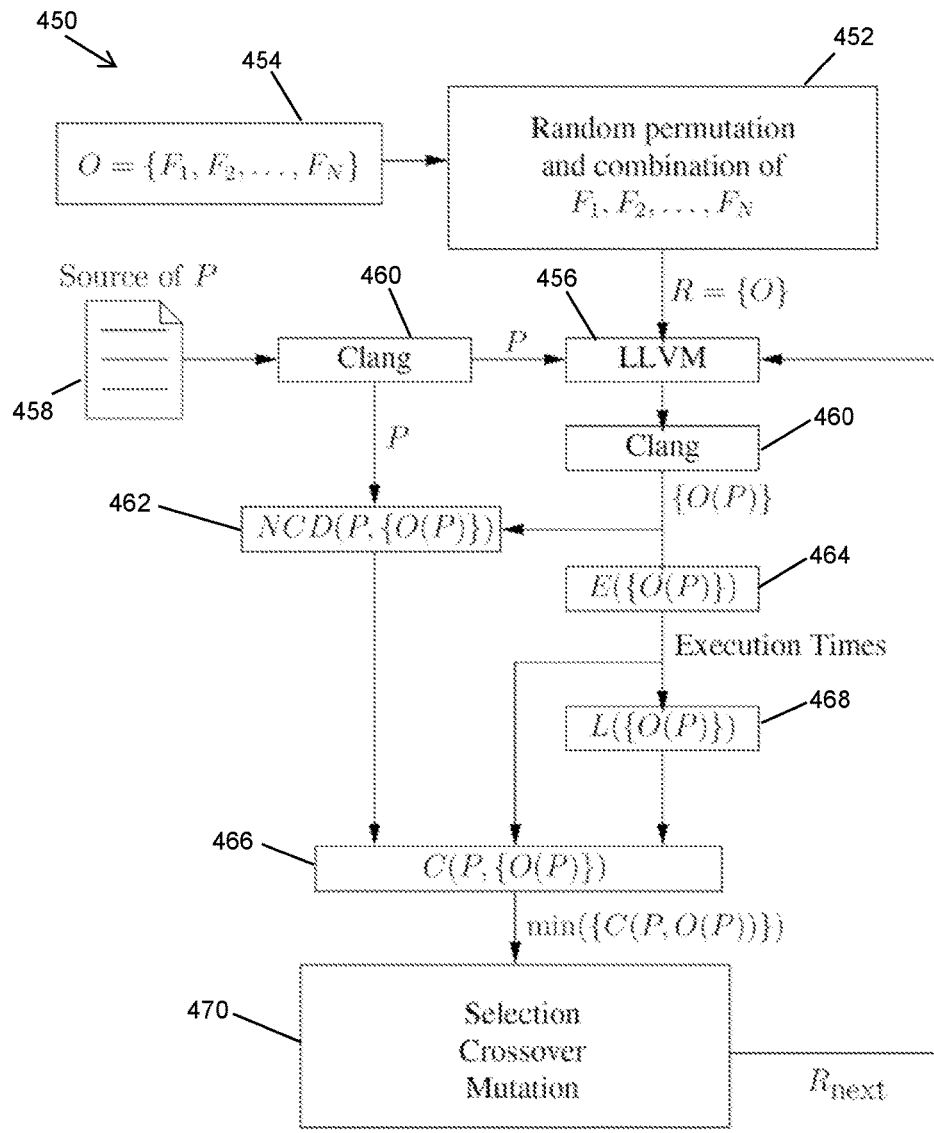
FIG. 4B is a flowchart showing an obfuscation optimization framework according to an embodiment of the present invention.
FIG. 4C shows an example chromosome model used in genetic algorithms in embodiments of the present invention.

FIG. 4B is a flowchart showing an obfuscation optimization framework according to an embodiment of the present invention. The framework 450 solves the obfuscation optimization problem of finding a set of obfuscation transformations and their sequences from a pool of transformation functions is defined as: Given a particular application P and the number of obfuscation transformation functions $O=\{F_1, F_2, \ldots, F_N\}$ with each function having multiple configurable parameters, i.e. $F_1=\{f_1^1, \ldots, f_1^m\}$, $F_2=\{f_2^1, \ldots, f_2^n\}, \ldots, F_N=\{f_N^1, \ldots, f_N^o\}$ find a permutation and combination of O for which O(P) results in the lowest execution time E(P), the highest obfuscation complexity NCD(P,O(P)), and the lowest channel leakage L(O(P)).

Therefore, the cost of the overall optimization problem can be formulated as:

$$C(O,P)=\alpha \times E(P)+\beta \times (1-NCD(P,O(P)))+\gamma \times L(O(P)) \quad (1)$$

with $\alpha$, $\beta$, and $\gamma$ being the weights of the respective parameters.

In step 452, a sequence $G \subseteq O$ representing a chromosome is selected from the set of possible transformation functions O 454. Each gene $g \in G$ corresponds to an obfuscation transformation function ($F_i^j$) with different permutations and combinations. All sequences combined form a random population R consisting of |R|=M chromosomes in total.

The LLVM compiler framework 456 transforms the source code 458 via a Clang frontend 460 into M executable programs {O(P)}, each obfuscated according to the elements of $F_i^j$. Their similarities are compared to the original source code to determine the effectiveness and therefore the quality of the obfuscation 462 NCD(P, O(P)).

At the same time, the obfuscated binaries are executed in a test environment 464. The test environment 464 simulates the worst possible, but realistic execution circumstances. For instance, the programs may be executed on bare-metal RISC-V CPUs to prevent an operating system (OS) with its interrupt manager and scheduler from interfering with the program execution. These interruptions in the program flow introduce noise and artificially lower the leakage through side-channels. Since the framework targets embedded systems, an OS may be assumed to be absent.

The costs C(P,O(P)) consisting of the program execution times, their leakages 468 for different input parameters and their similarities 462 to the original (unobfuscated) version, are computed.

In step 470, transformations resulting in the champions with the lowest costs survive for the next iteration via tournament selection, new genes are created by crossover and mutations of individual chromosomes. After twin removal, this set of transformation functions are then given to the LLVM to obtain the parameters for the next generation. This process continues iteratively, till the best transformation sequence emerges.

Software complexity metrics can be used to evaluate the effectiveness of obfuscation [8] by quantitatively illustrate to what degree the program has been changed, or how many more elements should be considered to understand the program. It reflects the obfuscation potency, the "difficulty". The higher the value of complexity metric, the more complex the program will be. The following software complexity metrics may be used: Lines Of Code (LOC), Halstead complexity metric (HCM), Cyclomatic Complexity Metric (CCM) and Normalized Compression Distance (NCD).

While the framework 450 supports several methods to compute complexity metrics, for in one embodiment, the framework 450 employed NCD which is approximated by the Kolmogorov complexity as shown in equation (2).

$$NCD(P, (O(P))) = \frac{S(K(P \mid O(P))) - \min(S(K(O(P))), S(K(P)))}{\{\max(S(K(O(P))), S(K(P)))\}} \quad (2)$$

For P=O(P), an ideal compressor K, and with function S returning the size of the program under consideration, NCD (P,P)=0. For a high degree of dissimilarity such as a high quality of obfuscation, NCD(P, P)=1.

Apart from increasing the costs for reverse-engineering attacks, this framework also studies the effect of obfuscation on side-channel leakage. A side-channel is a communication channel created by unintentional information leakage by a victim program. It can be measured by Shannon's Theorem which is widely used in information theory to measure the rate at which information can be reliably transmitted over a communication channel and is hence also called Channel Capacity.

In timing side-channel leakages, a program has a higher Channel Capacity, if e.g. the values of input parameters have a significant impact on the program execution time due to different lengths of control flow paths taken. In addition the execution time is impacted further by multi-cycle, variable-latency arithmetic instructions whose latencies depend on the operand values. Such characteristics are commonly found for multiplications, divisions and modulo operations, whose hardware units can take shortcuts such as earlyouts to produce the results faster. An attacker examines these timing variations as a function of e.g. the parameter values and is able to extract sensitive implementation details and data from a victim program.

The Channel Capacity L, execution time E and obfuscation quality NCD are parameters given to the cost function C (see equation (1) above). Its results are forwarded to the heuristic engine which includes genetic operations to explore the different permutation and combination of obfuscation transformation functions.

Obfuscator-LLVM supports three main obfuscation transformations:
(1) Instruction substitution (SUB)
(2) Insertion of Bogus Control Flow (BCF) and
(3) Control Flow Flattening (FLA)

Each of the transformation functions can be fine-tuned through additional parameters. For instance, SUB and BCF can be applied multiple times iteratively including parameters configuring the application probability. Each transformation is considered a gene and multiple genes are combined to form a chromosome.

FIG. 4C shows an example chromosome model used in genetic algorithms in embodiments of the present invention. The numbers after the obfuscation transformation indicate how many times the function is applied (i) and its application probability p. For instance, gene 1 in FIG. 4C indicates the insertion of Bogus Control Flow into the source code, with 2 iterations and an application probability of 73%, which is followed by the instruction substitutions (SUB) in gene 3. As it can be observed, the same transformations can occur multiple times in a chromosome and not every gene carries a transformation function resulting in a varying chromosome length. A different sequence of the same genes results in distinct program characteristics. Hence those sequence are not considered to be twins.

Figures 5, 6:
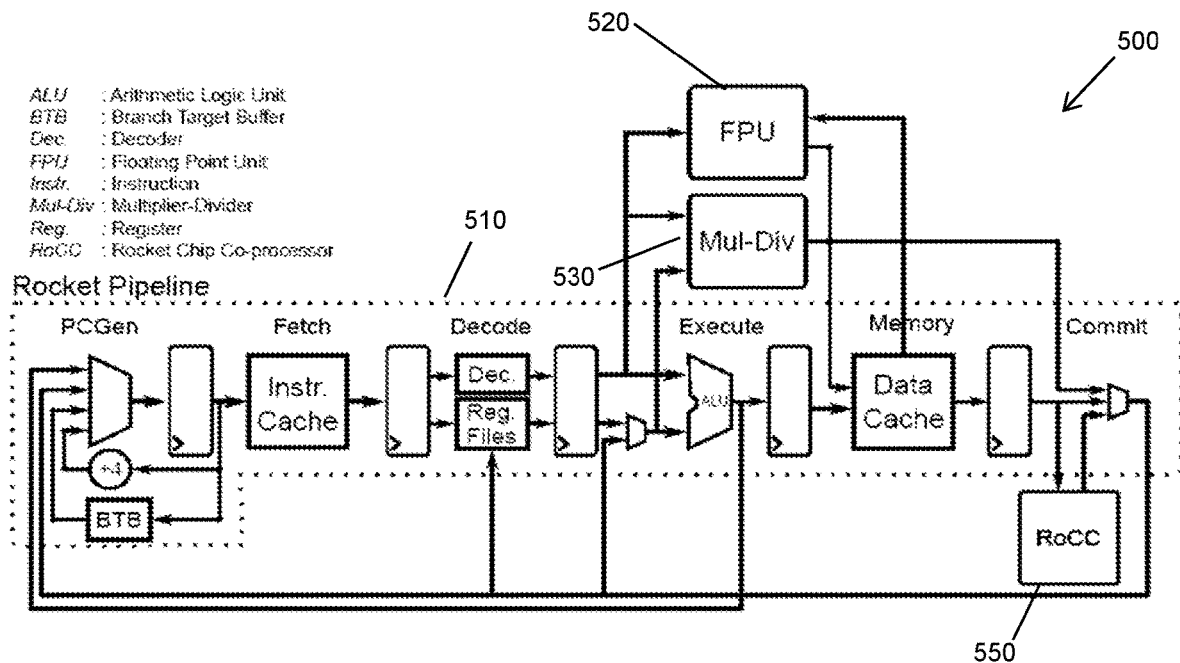
FIG. 5 is a block diagram showing a target processor for execution of obfuscated computer program code according to an embodiment of the present invention.
FIG. 6 is a table showing hardware resource utilization of the co-processor that implements the hardware diversification of embodiments of the present invention compared to the base processor.

FIG. 5 is a block diagram showing a target processor for execution of obfuscated computer program code according to an embodiment of the present invention.

The target processor 500 is implemented as a RISC-V architecture that comprises a rocket core 510, a floating point unit (FPU) 520, a multiplier-divider (Mul-Div) 530 and a rocket chip co-processor (RoCC) 550. The rocket chip co-processor 550 is a tightly integrated extension to the processor pipeline and can stall the entire pipeline until custom instructions (CIs) have been executed. The target processor 500 may be implemented as a Zynq7000 XC72Z020 FPGA device. The base processor has been augmented with a coprocessor (RoCC) for realizing the hardware diversity as shown in FIG. 5.

FIG. 6 is a table showing hardware resource utilization of the co-processor that implements the hardware diversification compared to the base processor. As shown in FIG. 6, the hardware resource utilization is reported in terms of the number of slices and DSP blocks for FPGA implementation on a Zedboard. The area overhead of the coprocessor (RoCC) is negligible (i.e. 1% of slices) compared to the entire Rocket chip system. Thus, the proposed hardware diversification method (implemented in RoCC) does not require significant changes to the base processor and occupies only a fraction of the entire system.

Figure 7:
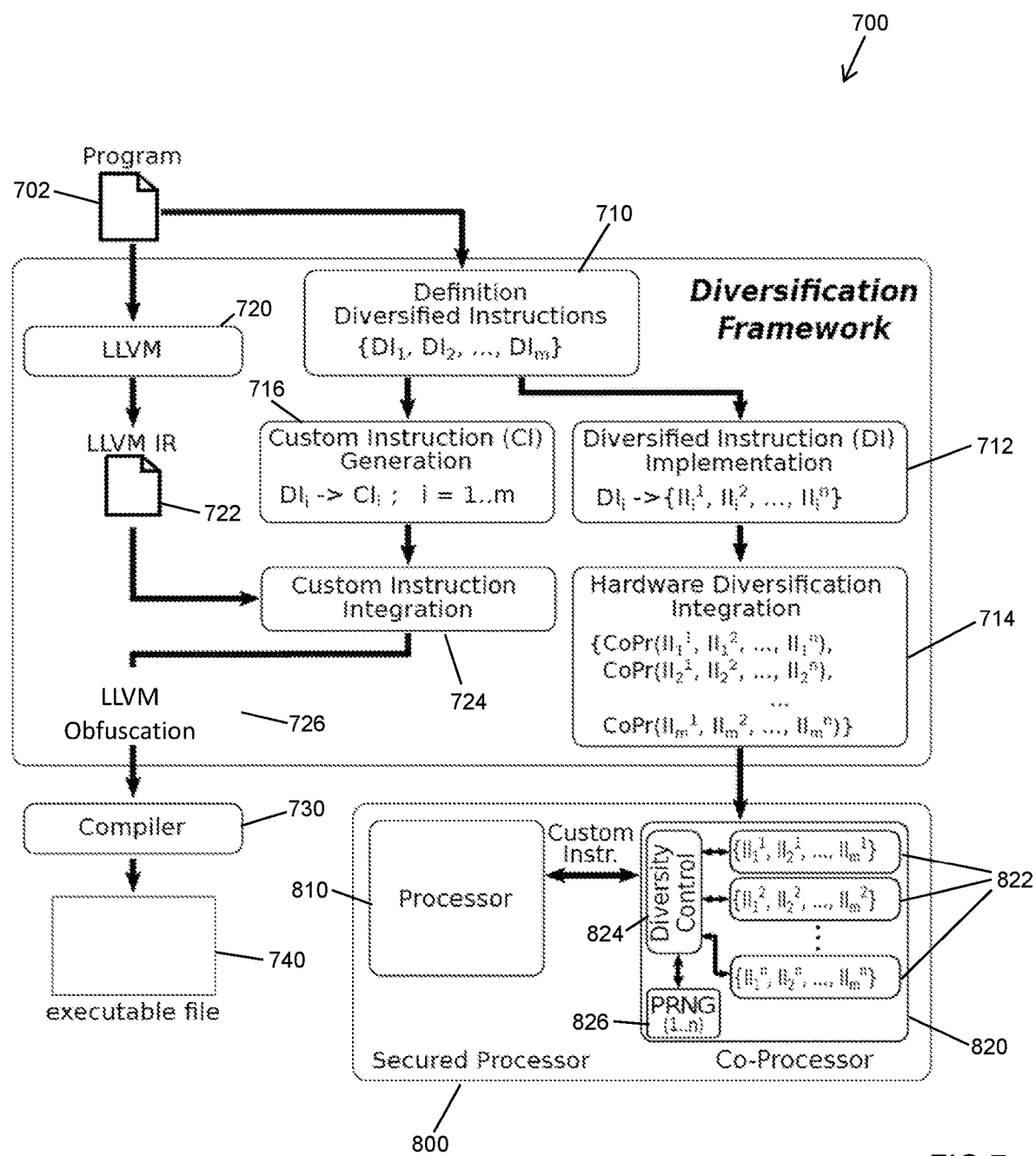
FIG. 7 is a block diagram showing a diversification framework for hybrid program obfuscation according to an embodiment of the present invention.

FIG. 7 is a block diagram showing an obfuscation framework for hybrid program obfuscation according to an embodiment of the present invention. The hybrid program obfuscation reduces side-channel-leakage significantly while being effective against the code reverse engineering attack. Hardware diversification is implemented using diversified instructions (DIs). As an example, a set of instructions usually present in cryptographic programs, that are critical from the channel leakage perspective, is predefined. The implementation of the framework consists of two parts.

The obfuscation framework 700 shown in FIG. 7 may be implemented in the obfuscation module 322 of the obfuscation compiler system 300 shown in FIG. 3. As shown in FIG. 7, the obfuscation framework 700 takes computer program source code 702 as input.

Figure 8:
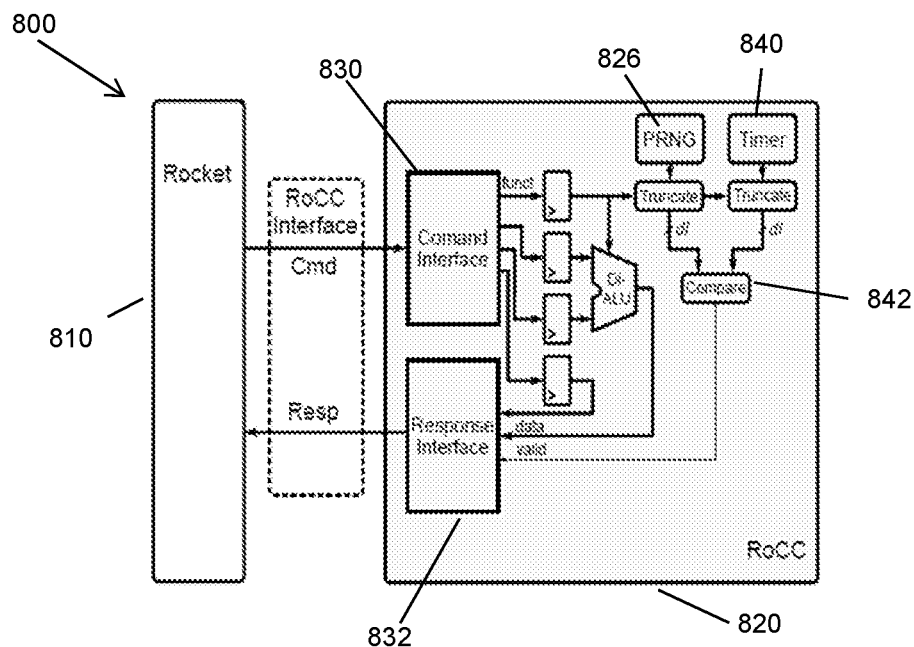
FIG. 8 shows an example implementation of a co-processor for hardware diversification according to an embodiment of the present invention.

The first part consists of the hardware implementation for diversification, shown on the right hand-side of FIG. 7. Let $DI=\{DI_1, DI_2, \ldots, DI_m\}$ be m diversified instructions 710. Each $DI_i \subseteq DI$ with $1 \leq i \leq m$ specifies an instruction (or a group of instructions) that need to be protected. Further, each $II_i^j \in DI_i$ represents a diversified version 712 of the same operation with $1 \leq j \leq n$. Therefore every instance $II_i^j$ provides the same mathematical functionality (i.e. $f(II_i^1), \ldots f(II_i^n)$), but exhibits different execution characteristics. For each $DI_i$, a corresponding hardware module 714 $CoProc(DI_i)$ is implemented in a hardware description language (HDL). These modules are integrated as custom instructions (CI) 822 in the co-processor 820 which forms the target processor 800 coupled with the processor 810. The co-processor additionally comprises a Diversity Control Unit 824 and a Pseudo Random Number Generator (PRNG) 826. In some embodiments a True Random Number Generator (TRNG) may be used in 826. At runtime, the Diversity Control Unit 824 selects the corresponding set $DI_i$ based on the CI, while the random number determines the $II_i^j$ to be executed. Hence with every invocation of a CI, a different $II_i^j$ is selected, resulting in non-deterministic execution times of the program. The result is sent back to the processor after completion of the CI execution. Alternatively, as shown in FIG. 8, instead of implementing multiple versions of the same instruction for each $II_i^j \in DI_i$ with varying execution times, only one hardware module is implemented for $f(II_i^j)$ for all elements in $DI_i$. In this case, the PRNG 826 is connected to a comparator that triggers a valid signal when the random value matches the output of the countdown timer. This indicates the completion of the operation on the co-processor and the valid result is available for the processor. Both approaches result in a reduction of side channel leakage.

FIG. 8 shows an example implementation of a co-processor for hardware diversification according to an embodiment of the present invention. As shown in FIG. 8, the target processor 800 comprises a processor 810 and a co-processor 820. The processor 810 and the co-processor 820 interact via a command interface 830 and a response interface 832. In this example, the co-processor 820 comprises a PRNG 826 and a timer 840 which are connected to a comparator 842. As mentioned above, the co-processor 820 therefore sends a response to the processor 810 when the output of the timer 840 matches the output of the PRNG 826. Thus a random timing element is introduced into the timing of the responses from the co-processor 820.

By using a custom co-processor 820 to execute custom instructions, no drastic changes are made to the target processor 800 architecture. The framework also avoids negative effects on normal programs that run in the same environment with the security critical programs, as these normal programs are executed on the base processor. Our solution also does not require a user to write programs in a new language or in a secured manner. The custom instructions are kept as private information and automatically inserted into the critical programs to protect from side-channel attacks.

Returning now to FIG. 7, the second part of the obfuscation is the compilation-related operation, shown on the left hand-side of FIG. 7. In this example system, we use a custom LLVM compiler stage 720 to generate LLVM intermediate representation code 722. In a custom instruction insertion step 724 the CIs are inserted into the cryptographic programs during compilation. After adding the CIs, an LLVM obfuscator 726 such as that described in reference [24] is used to enable protection against disclosure attacks (i.e. reverse engineering) on the algorithm implementation and CI integration. The analytical algorithm or Genetic Algorithm (GA) based optimization approach described in above is used to determine the combination of obfuscation techniques that leads to solutions with the best obscurity-performance trade-offs, and low side-channel leakage. In particular, the proposed technique employs the normalized compression distance (NCD) as a metric for obscurity. For the heuristic approach, we also re-purpose the fitness function of the GA-based algorithm to include the channel capacity, which is the measure of side-channel leakage. We proposed a modified crossover to enable variable length genotypes in the GA. Currently this obfuscator is optional in the framework and can be disabled, if code reverse engineering protection is not required.

Following the LLVM obfuscation by the LLVM obfuscator 726, the obfuscated code is compiled by a compiler 730 to generate an obfuscated executable file 740.

Keeping the functionality of the hardware diversification unit confidential and since it can represent one or multiple instructions and/or whole functions, adds another difficulty level to the attacker. The attacker who has access to the binaries can observe the CI but will not have any knowledge of its functionality. Since the hardware diversification is coupled with the functionality, an attacker cannot remove the diversification to launch the side-channel attack without disrupting the functionality of the program. If the diversification is implemented as software in the victim program as in existing approaches, the attacker will be able to isolate the diversification from the functionality of the program, which renders the diversification ineffective.

Figure 9A:
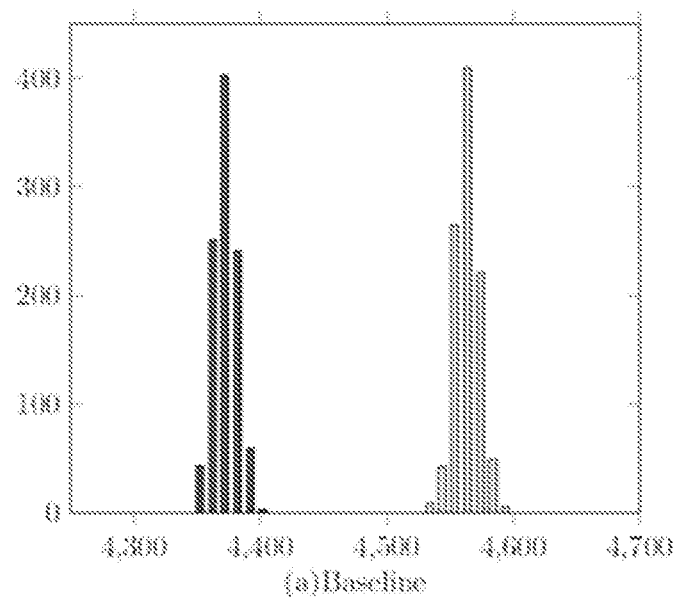
FIG. 9A to FIG. 9D show a comparison of timing histograms for different obfuscation techniques.
Figure 9B:
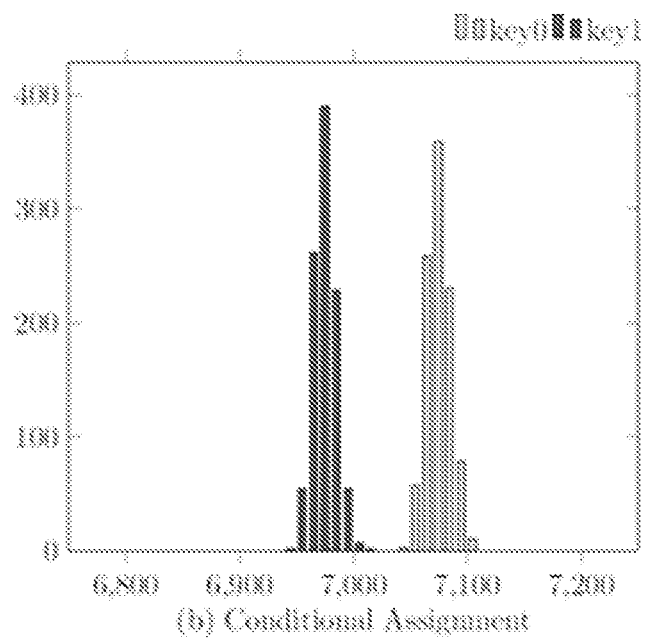
Figure 9C:
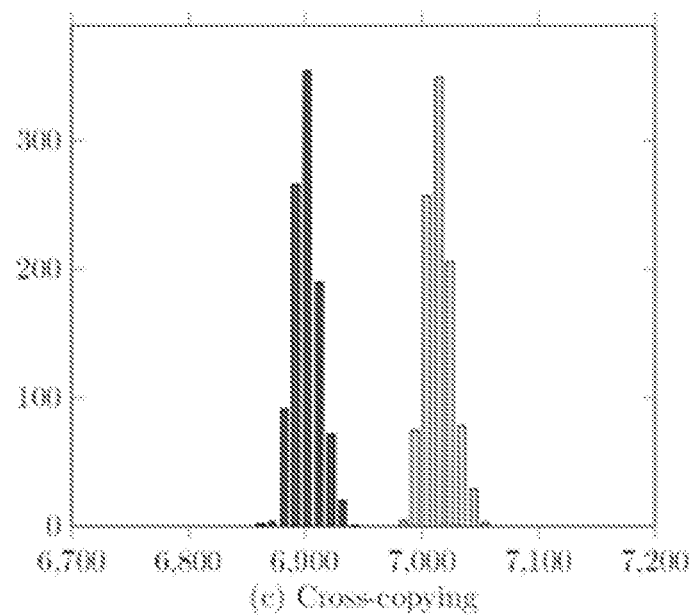
Figure 9D:
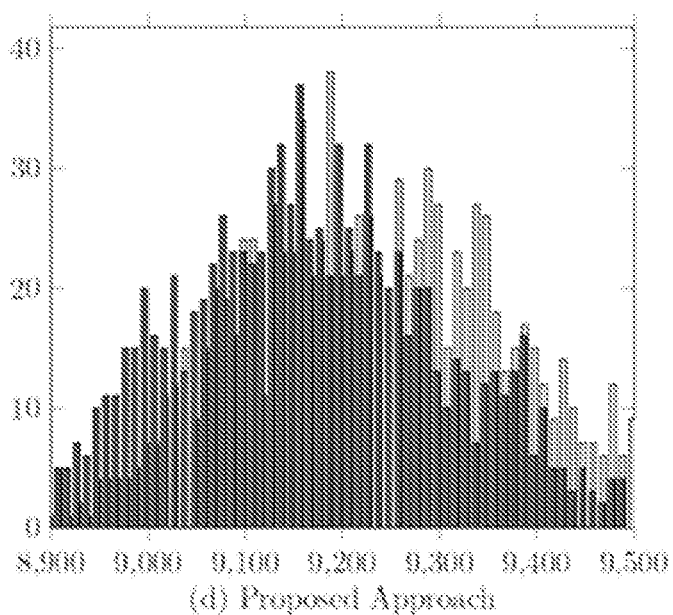

FIG. 9A to FIG. 9D show a comparison of timing histograms for different obfuscation techniques. FIG. 9A shows the timing histogram of a baseline program. FIG. 9B shows the timing histogram after transformation using conditional assignment. FIG. 9C shows the timing histogram using cross-copying. FIG. 9D shows the timing histogram using the hardware obfuscation methods described herein. The programs are executed on the RISC-V Rocket core [22] in bare metal mode. In each plot the x and y-axis show the execution time in clock cycles and number of instances with that execution time respectively.

FIG. 9B and FIG. 9C highlight the limitations of conditional assignment and cross copying. It is evident that the timing characteristics corresponding to the two different keys, can be clearly distinguished with the existing approaches and hence, they do not provide effective countermeasures against timing side-channel attacks. As shown in FIG. 9D, the proposed dynamic hardware diversification provides a more effective countermeasure against timing side-channel attacks than existing approaches. Finally, even if an attacker successfully performs a reverse engineering attack to understand the implementation details of the algorithm, it will still be difficult to perform side-channel attack due to the hardware assisted program diversification.

Previous works on software diversity focused on randomizing the program representation, e.g. the in-memory addresses of code and data so that attackers will not have precise knowledge of their target. Such methods are effective against code reuse and other related attacks as they only rely on static properties of a program. However, the existing software diversity methods do not provide an effective countermeasure against side-channel attacks. This is because such attacks rely on dynamic properties of programs, i.e. execution time, memory latencies, or power consumption. Consequently, diversification against side-channels must randomize the program's execution rather than its representation. The works in [6]-[8] address this problem by generating diverse but functionally equivalent components of the program at compile time, and randomly executing the components on the processor at runtime. However, these methods incur high code density and high execution overheads, which is not suitable for embedded systems with tight computational and resource constraints or in high performance systems where low overheads are required. Our invention employs a compiler to automatically replace security critical instruction/functions as instructions that exhibit random execution characteristics at runtime. As such, the invention leads to code size that is either equivalent to the original code size (if only instructions in the original code is replaced) or reduced code size (if the inserted instructions replaces a sequence of instructions or the entire function). Besides, the hardware implementation provides more options for diversification and optimizations by exploiting parallelism. In addition, by incorporating state-holding elements or local memories in the specialized cryptographic implementations, we expect to simultaneously eliminate a large portion of memory traffic and mitigate cache-based side-channel attacks. Our dynamic hardware diversification will be significantly more energy-efficient as it does not incur high code density and high execution overheads.

In contrast to existing works on dynamic compilation [9]-[12] and hardware obfuscation [13]-[20], the proposed hardware diversification does not require changes to the base processor architecture and introduces negligible hardware and power overhead. This is particularly important for embedded systems that usually have tight computational and resource constraints or in high performance computing, where a hardened program requires low performance overhead.

The impact of obfuscation methods on performance, channel capacity (leakage) and obfuscation strengths of these two examples are discussed in the following subsections. First, we consider the three optimization metrics (performance, leakage and obscurity) separately and explain the effects of each metric on the others, before considering them together. We will also show that the invention overcomes the limitations of existing countermeasures.

Figure 10A:
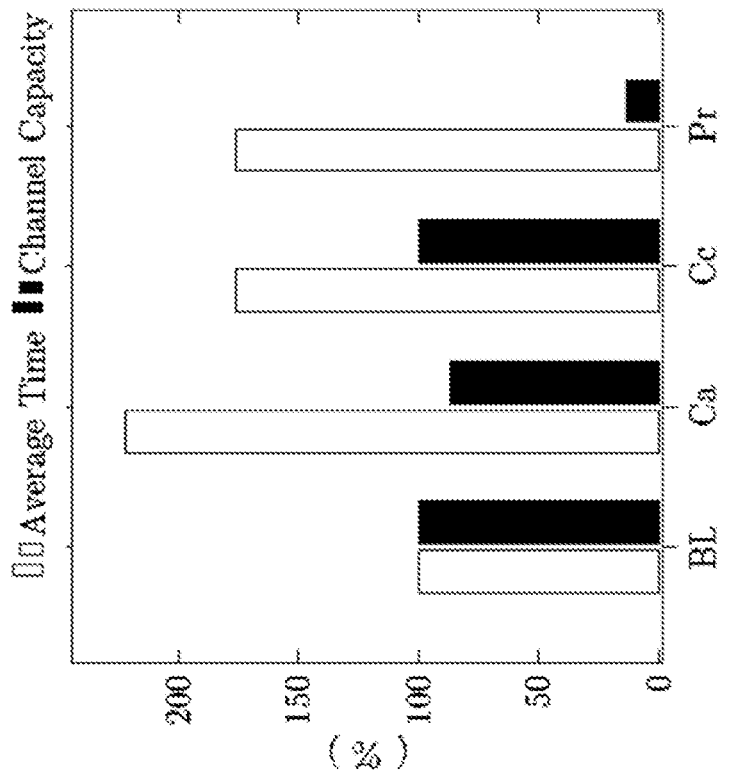
FIG. 10A and FIG. 10B show comparisons of average execution time and channel capacity of the proposed method with existing methods.
Figure 10B:
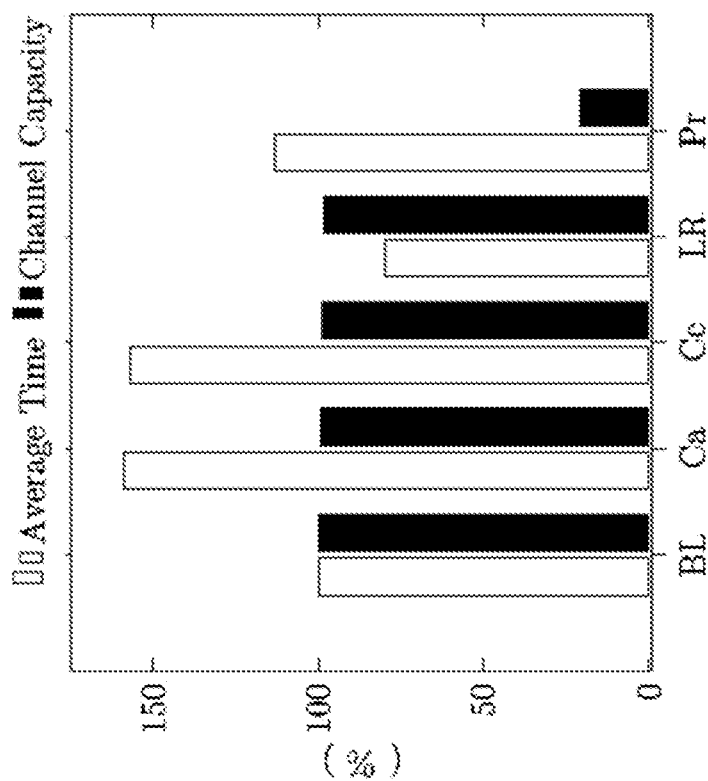

FIG. 10A and FIG. 10B show comparisons of average execution time and channel capacity of the proposed method with existing methods. In this example, we consider the problem of timing side-channel attacks. To demonstrate the effectiveness of our invention, we present two representative functions that are commonly used in cryptographic algorithms: As shown in FIG. 10A, modExp providing the RSA modulo exponent functionality [29] to encrypt and decrypt a message from the benchmark suite in [28]. It consists of a loop with a static iteration count, often found in cryptographic algorithms such as AES. As shown in FIG. 10B, a modular multiplication from the IDEA cipher implemented in mulMod16 [30].

FIG. 10A and FIG. 10B compare the performance overhead and the leakage reduction of the various countermeasures with respect to the baseline for the modExp and mulMod16 benchmarks in bare-metal mode. The performance overhead and the leakage reduction are evaluated in terms of the average execution time and the channel capacity. Pr denotes the programs that utilizes the proposed method. It can be observed that the existing solutions have a negligible reduction in channel capacity, whereas Pr achieves a significant reduction. The channel capacity (leakage) of Pr is reduced to 20% and 14% for the modExp and mulMod16 benchmarks, respectively. Both existing solutions and Pr results in an increase in average execution time with the exception of LR (existing sliding window technique [23]) in the modExp benchmark. The execution time increases due to the insertion of dummy instructions to balance branches in security critical conditions for existing methods and the long variable execution times of custom instructions. For the modExp benchmark, Ca (conditional assignment) and Cc (cross-copy) increase the execution time by over 50% compared to BL (baseline), whereas the proposed solution has an increase in execution time of only 13%. Moreover, Ca and Cc in the mulMod16 benchmark result in a significantly higher execution time by 120% and 75% respectively in comparison to BL. Even though the invention results in a similar execution time for mulMod16 compared to Cc, it is able to achieve a significant reduction in channel capacity unlike Cc. It is worth mentioning that the timing cost in our proposed solution just applies to the critical functions that use the CIs to mitigate timing side-channel leakage. The execution time of the remaining normal functions will not be affected.

Figure 11:
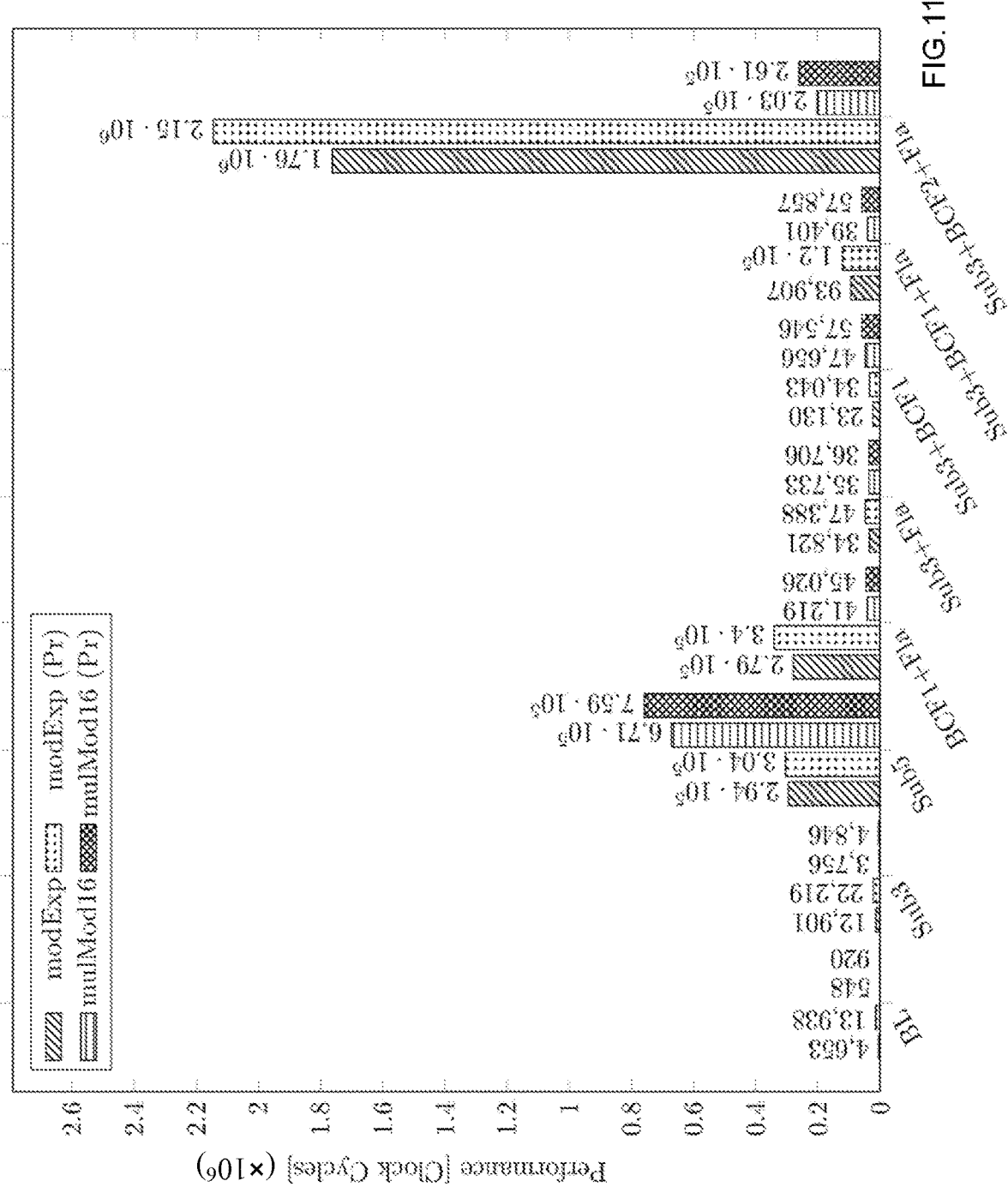
FIG. 11 shows the performance impact of multiple existing obfuscation techniques applied to the original source code of two examples.

FIG. 11 shows the performance impact of multiple existing obfuscation techniques applied to the original source code of two examples. The examples are the modExp and mulMod16 source codes. Performance is shown with and without the integration of hardware diversification which is marked (Pr) in FIG. 11. As can be observed, different techniques result in dramatically different execution times. For example, while an obfuscation sequence of Sub5 (substitutions of instructions with α iterations) results in an execution time for modExp that is 63 times slower, the impact of the same sequence to the mulMod16 example is higher with 1225 times. Similarly, the Sub3+BCF2+Fla (instruction substitution with 3 iterations, insertion of bogus flow control with 2 iterations and flattering [Fla] of the control flow graph of the input program) sequence applied to mulMod16, results in a lower execution time compared to Sub5, while the execution of modExp takes considerably longer. The optimization parameter of performance therefore does not only depend on the complexity of the obfuscation techniques, but also on the behavior of the input program.

Figure 12:
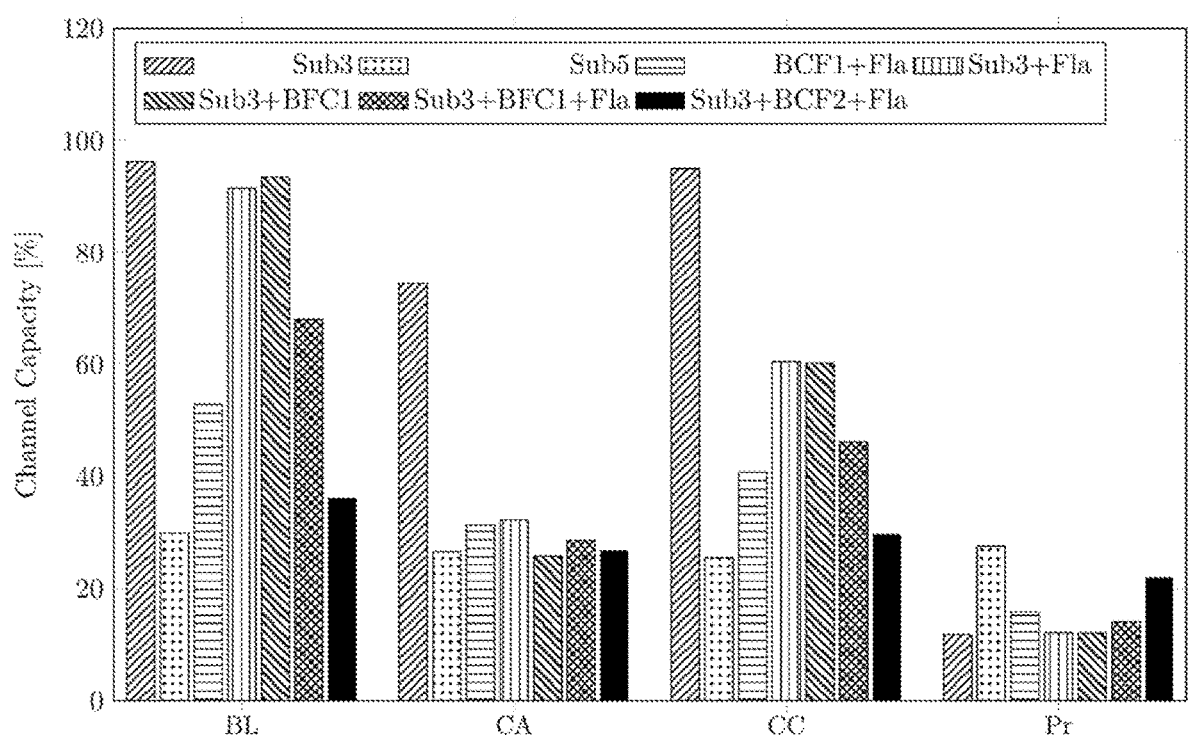
FIG. 12 shows the impact of selected obfuscation methods on channel capacity.

FIG. 12 shows the the impact of several obfuscation methods on channel capacity. In FIG. 12, the obfuscation methods are applied to the modExp example. Here, a lower capacity results in fewer information leaked through the channel making it more difficult for an attacker to correlate implementation details and secrets to the program execution time. While Sub3 has only a marginal impact on the channel capacity reduction, Sub5 shows a lower leakage. If Sub3 is combined with Flattening (Fla) or Bogus Control Flow (BCF1), no reduction could be observed. However for the implementation which has been modified by manually implementing the conditional assignment (Ca), the channel capacity has been reduced significantly for Sub3+Fla as well as Sub3+BCF1.

Since in this example the implementation of BL and Ca is very different, it can be concluded that the channel capacity is a function of the obfuscation techniques applied and the structure of the input program. Referring to FIG. 11 and considering the results shown in FIG. 12, a programmer might choose the obfuscation technique of Sub5 over Sub3+BCF2+Fla, since for approximately the same reduction of channel leakage, the binary program is faster in execution time. It can be observed the integration of hardware diversification (Pr) has only a marginal impact on the channel capacity of the Sub5 program. However, if the programmer selects Sub3+BCF1 and hardware diversification, the program execution is not only the fastest (FIG. 11), but also results in a low information leakage.

To quantify the strength of the obfuscation, we use the Normalized Compression Distance (NCD), essentially a metric which represents, how dissimilar the obfuscated program is to the original source.

Figure 13:
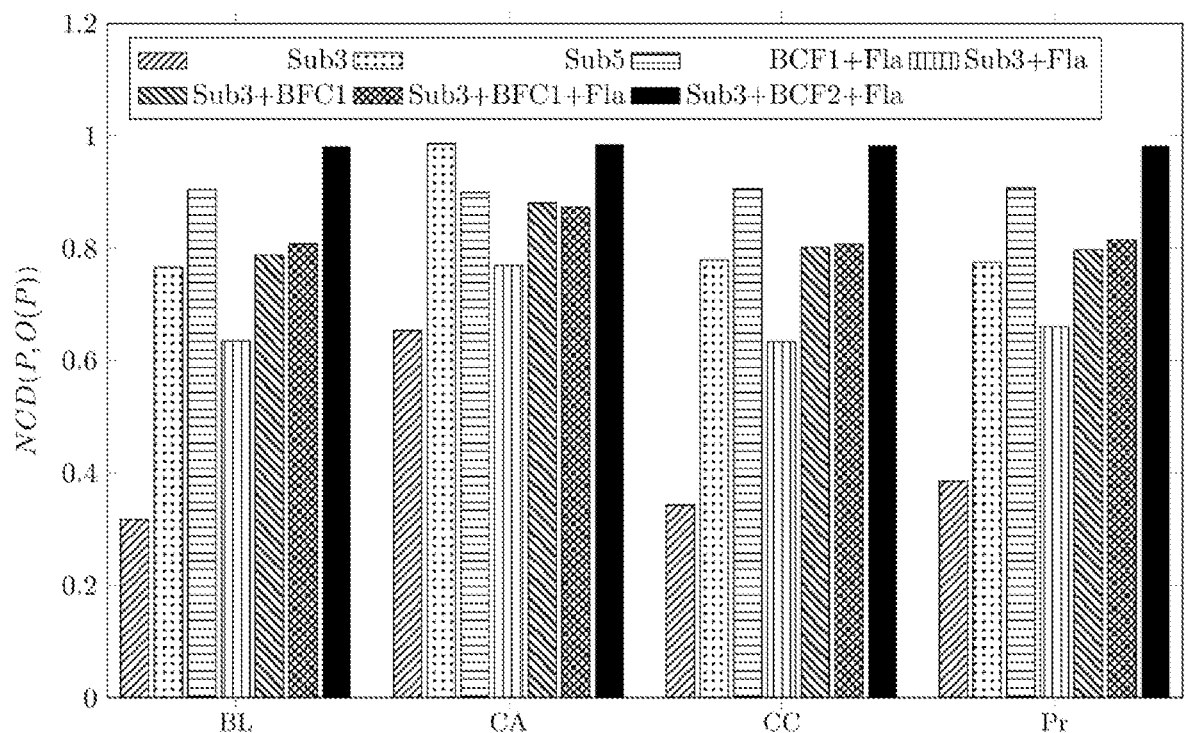
FIG. 13 shows the impact of selected obfuscation methods on normalised compression distance.

FIG. 13 shows the impact of a few selected obfuscation methods on the NCD with a value close to 1 indicating a high dissimilarity. As can be observed, if only Sub3 is applied, the resulting obfuscated code is similar to the original code. If more complex obfuscation methods are used, the more dissimilar are the resulting programs. It can be observed that Sub3 is more effective when it is applied to the program code which was manually transformed by inserting Conditional Assignments (Ca). Hence it can be concluded that NCD does not only depend on the sequence and degree of obfuscation methods, but also on the structure of the input program. In this case choosing Sub3 results in the fastest obfuscated program executions (refer to FIG. 11), at the cost of a lower degree of obfuscation and higher leakage (FIG. 12). The previously selected Sub3+BCF1 obfuscation sequence results in a low leakage and fast execution times with an NCD that is at par with Sub5.

Figure 14:
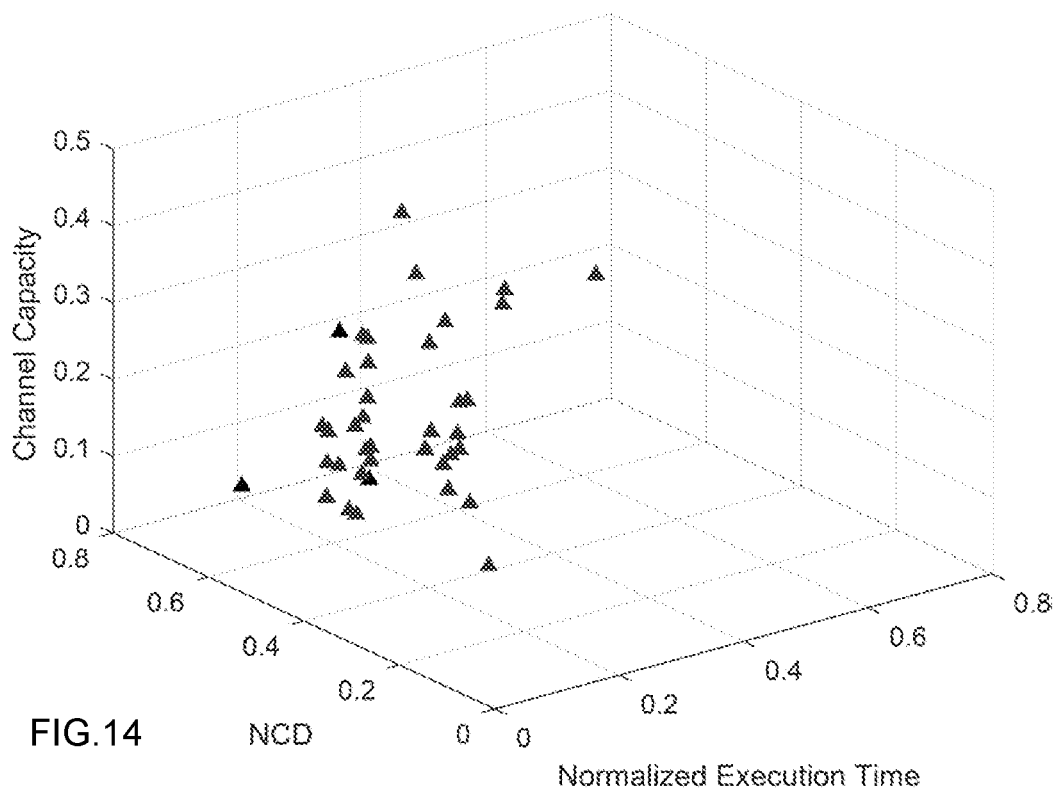
FIG. 14 shows a plot of normalized execution time, obscurity and information leakage illustrating the design space for embodiments of the present invention.

FIG. 14 shows a plot of normalized execution time, obscurity and information leakage. FIG. 14 shows Normalized execution time vs. NCD (obscurity) vs. channel capacity (information leakage) of the modExp benchmark. From the discussion above, it is evident that determining an optimal set of obfuscation techniques that can lead to high obscurity and low performance overhead is non-trivial. The problem is further magnified if we also need to generate obfuscated codes with low leakage. Embodiments of the present invention address this problem by efficiently generating an obfuscated code that will run on the target processor with high obscurity, low leakage and low performance overhead. In particular, the present disclosure aims to solve the following problem statement: For a given input program P, determine the obfuscation transformations and parameters (such as number of iterations in each sequence), such that the resulting program executes the fastest and is sufficiently protected against side-channel and reverse engineering attack. FIG. 14 shows the design exploration space of the modExp benchmark, where each point in the plot is an instance with varying performance, obscurity and leakage.

It is envisaged that embodiments of the present invention will benefit a wide range of applications in various industries and markets such as industrial automation, automotive, medical, environmental monitoring, etc. that are deployed on various computer systems including Internet-of-Things (IoT) and need to be protected from disclosure attacks through code reverse engineering and/or side-channel attacks.

These applications include cryptographic algorithms where the key must be protected from side-channel attacks, or proprietary algorithms where the implementation or algorithmic details must be protected from disclosure attacks. In addition, faults and bugs in software can be masked and become more difficult to detect if the source code is obfuscated. Also, since it is possible for the attacker to have physical access to the devices (especially if they are deployed as IoT), the attacker may be able to launch side-channel attacks. The obfuscation techniques of the present disclosure can mitigate reverse engineering and side-channel attacks in computer systems with an acceptable program execution time overhead.

Whilst the foregoing description has described exemplary embodiments, it will be understood by those skilled in the art that many variations of the embodiments can be made within the scope and spirit of the present invention.

The invention claimed is:

1. A method of generating obfuscated binary code from input source code for execution on a target processor, the method comprising:
   generating a set of random obfuscation transform selections;
   initializing a candidate set of obfuscation transform selections with the set of random obfuscation selections;
   iteratively optimizing the obfuscation transform selections of the candidate set of obfuscation transform selections until a termination criterion is met by:
      for each candidate obfuscation transform selection of the candidate set of obfuscation transform selections:
         applying the obfuscation transform selection to the input source code to generate candidate obfuscated source code;
         compiling the candidate obfuscated source code to generate candidate obfuscated binary code;
         calculating an obfuscation metric for the candidate obfuscated binary code;
         calculating an execution time metric for the candidate obfuscated binary code;
         calculating a security metric for the candidate obfuscated binary code; and
         based on the calculated obfuscation metric, the calculated execution time metric and the calculated security metric for each candidate obfuscation transform selection, performing genetic operations to update the candidate set of obfuscation transform selections; and
   once the termination criterion is met, generating an optimized obfuscation transform selection from the candidate set of obfuscation transform selections,
   applying the optimized obfuscation transform selection to the input source code to obtain optimized obfuscated source code; and
   compiling the optimized obfuscated source code to generate obfuscated binary code.

2. A method according to claim 1, wherein the target processor comprises a main processor and a co-processor and the obfuscation transform selections comprise indications of custom instructions which are executable on the co-processor.

3. A method according to claim 2, wherein the custom instructions indicate a plurality of diversified instructions from which the co-processor selects one diversified instruction during execution.

4. A method according to claim 2, wherein the custom instructions are configured to cause the coprocessor to delay for a time period selected during execution.

5. A method according to claim 1, wherein calculating the obfuscation metric for the candidate obfuscated binary code comprises calculating a normalized compression distance between the candidate obfuscated binary code and binary code obtained by compiling the input source code.

6. A method according to claim 1, wherein calculating the execution time metric for the candidate obfuscated binary code comprises executing the candidate obfuscated binary code in a target processor execution environment.

7. A method according to claim 6, wherein the target processor execution environment comprises a hardware implementation of the target processor.

8. A method according to claim 1, wherein calculating the security metric for the candidate obfuscated binary code comprises estimating a measure of side channel leakage.

9. A method according to claim 8, wherein estimating the measure of side channel leakage comprises executing the candidate obfuscated binary code in a target processor execution environment.

10. A non-transitory computer readable carrier medium storing computer executable program instructions which when executed on a processor cause the processor to carry out a method according to claim 1.

11. A compiler system for generating obfuscated binary code from input source code for execution on a target processor, the compiler system comprising: a processor and a data storage device, the data storage device storing computer program instructions operable to cause the processor to:
generate a set of random obfuscation transform selections;
initialize a candidate set of obfuscation transform selections with the set of random obfuscation selections;
iteratively optimize the obfuscation transform selections of the candidate set of obfuscation transform selections until a termination criterion is met by:
for each candidate obfuscation transform selection of the candidate set of obfuscation transform selections:
applying the obfuscation transform selection to the input source code to generate candidate obfuscated source code;
compiling the candidate obfuscated source code to generate candidate obfuscated binary code;
calculating an obfuscation metric for the candidate obfuscated binary code;
calculating an execution time metric for the candidate obfuscated binary code;
calculating a security metric for the candidate obfuscated binary code; and
based on the calculated obfuscation metric, the calculated execution time metric and the calculated security metric for each candidate obfuscation transform selection; performing genetic operations to update the candidate set of obfuscation transform selections; and
once the termination criterion is met, generate an optimized obfuscation transform selection from the candidate set of obfuscation transform selections;
apply the optimized obfuscation transform selection to the input source code to obtain optimized obfuscated source code; and
compile the optimized obfuscated source code to generate obfuscated binary code.

12. A compiler system according to claim 11, wherein the target processor comprises a main processor and a co-processor and the obfuscation transform selections comprise indications of custom instructions which are executable on the co-processor.

13. A compiler system according to claim 12, wherein the custom instructions indicate a plurality of diversified instructions from which the co-processor selects one diversified instruction during execution.

14. A compiler system according to claim 12, wherein the custom instructions are configured to cause the co-processor to delay for a time period selected during execution.

15. A compiler system according to claim 11, wherein the data storage device further stores computer program instructions operable to cause the processor to: calculate the obfuscation metric for the candidate obfuscated binary code by calculating a normalized compression distance between the candidate obfuscated binary code and binary code obtained by compiling the input source code.

16. A compiler system according to claim 11, wherein the data storage device further stores computer program instructions operable to cause the processor to: calculate the execution time metric for the candidate obfuscated binary code comprises executing the candidate obfuscated binary code in a target processor execution environment.

17. A compiler system according to claim 16, further comprising a hardware implementation of the target processor and wherein the target processor execution environment comprises the hardware implementation of the target processor.

18. A compiler system according to claim 11, wherein the data storage device further stores computer program instructions operable to cause the processor to: calculate the security metric for the candidate obfuscated binary code by estimating a measure of side channel leakage.

19. A compiler system according to claim 18, wherein estimating the measure of side channel leakage comprises executing the candidate obfuscated binary code in a target processor execution environment.

20. A compiler system according to claim 19, further comprising a hardware implementation of the target processor and wherein the target processor execution environment comprises the hardware implementation of the target processor.

* * * * *